Sept. 10, 1957  R. M. M. OBERMAN  2,806,185
PHASE AND AMPLITUDE TESTING APPARATUS
Filed April 5, 1955

INVENTOR.
Roelof M.M. Oberman
by Michael S. Striker

United States Patent Office 2,806,185
Patented Sept. 10, 1957

2,806,185

PHASE AND AMPLITUDE TESTING APPARATUS

Roelof M. M. Oberman, Voorburg, Netherlands, assignor to Staatsbedrijf Der Posterijen Telegrafie en Telefonie, The Hague, Netherlands Application April 5, 1955, Serial No. 499,478

Claims priority, application Netherlands November 11, 1949

3 Claims. (Cl. 317—149)

The present invention relates to a phase and amplitude testing apparatus. More particularly, the present invention relates to an apparatus for testing the phase and amplitude of an alternating voltage or current of a predetermined frequency by comparison with a known alternating voltage or current. This application is a continuation-in-part application of my application Serial No. 195,429 filed November 13, 1950, now abandoned.

There are known systems for determining the amplitude and phase of an alternating voltage or current. These systems have the disadvantage that they introduce an operating time delay in the circuit which may give inaccurate results and which leads to a poor sensitivity. In addition, if these systems are used for testing three consecutive phases of a 12-phase alternating current or voltage system, the circuit becomes even less dependable. Also, with these more conventional test systems, it is not possible to test five consecutive phases of a 12-phase system. One such system is described, for example, in my copending application Serial No. 195,428 filed November 13, 1950, now abandoned.

The present invention accomplishes its purpose by converting a phase of the unknown current or voltage to be tested into a polyphase current or voltage. This polyphase voltage is then rectified in a full-wave rectifier. Accordingly, a rectified voltage is obtained which is proportional to the unknown current or voltage. The rectified voltage is used to control the conductive state of a comparison tube. Since the unknown phase is first converted into a polyphase voltage before it is rectified, no filtering circuits are required for smoothing out the rectified voltage or current and accordingly no time delay is introduced by the rectifying action.

The rectified voltage to be tested is then compared to a rectified voltage whose characteristics are known. This comparison is made in a comparison tube, for example, whose conductive state is varied when the voltage to be tested has the same characteristics as the known voltage. The change in the conductive state of the comparison tube can then be used to operate other devices for indicating the characteristic of the unknown voltage.

Accordingly, it is an object of the present invention to provide a new and improved method and apparatus for testing the phase and amplitude of an alternating current or voltage without any appreciable time delay.

Another object of the present invention is to provide a new and improved method and apparatus capable of testing more than three consecutive phases of alternating current or voltage of a 12-phase system.

A further object of the present invention is to provide a new and improved method and apparatus for testing the phase and amplitude of an alternating current or voltage by comparing it to a known current or voltage.

Still another object of the present invention is to provide a new and improved method and apparatus for testing the phase or amplitude of an alternating current or voltage without using any filtering elements in the circuit of the unknown current or voltage.

With the above objects in view, the present invention mainly consists of an arrangement for identifying the characteristics of a voltage by comparing a voltage having unknown characteristics with a comparison voltage of known characteristics, and including a first main circuit comprising a first electrical circuit having an input and an output and being adapted to be connected at its input end to a first single phase alternating current voltage whose characteristics are unknown and to be determined, means connected to the output of the first electrical circuit for transforming the single phase alternating current voltage to a polyphase alternating current voltage and first output means in the first electrical circuit for providing an output voltage proportional to the single phase alternating current voltage whose characteristics are to be determined; a second main circuit including a second electrical circuit having an input being adapted to be connected to a second single phase alternating current voltage whose characteristics are known, and second output means in the second electrical circuit for providing a second output voltage proportional to the single phase alternating current whose characteristics are known, a comparing circuit having inputs connected to the first and the second output respectively for comparing the characteristics of the known and unknown voltages, and means for indicating when the first unknown single phase alternating current voltage has characteristics of a predetermined relation to the known comparison voltage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
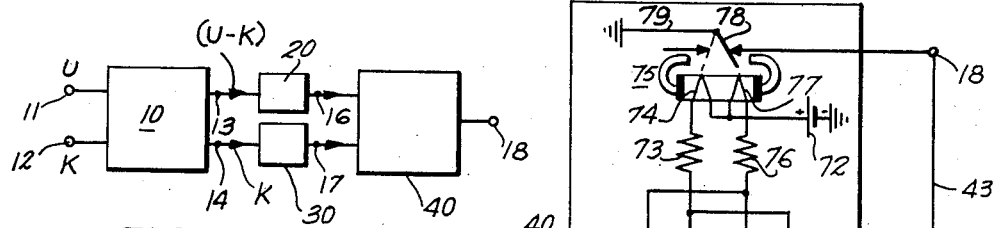
Fig. 1 is a block diagram showing the connections between the various elements of apparatus capable of carrying out the method of the present invention.

Referring now to Fig. 1 the block diagram which is shown can be used with automatic signalling systems or in systems for remote control or measurement. In Fig. 1 the unknown alternating voltage, U, to be tested is applied to the terminal 11 of a mixing device 10. This voltage may be any phase of a 12-phase system, for example. In such an arrangement, a known comparison voltage, K, is applied to the input terminal 12 of the mixer 10. The known voltage K has the same frequency and amplitude as the unknown voltage U, but may be of a different phase. Accordingly, the known voltage may be derived from the same 12-phase system as the unknown voltage.

The mixer 10 has two outputs indicated schematically at 13 and 14. At the output 13, there appears the difference voltage (U-K) which is applied to the input of a first rectifier 20. At the second output 14 of the mixer 10 there appears the known voltage K which is applied to the input of a second rectifier 30.

At the output 16 of the first rectifier 20 there appears a first rectified voltage whose amplitude is proportional to the difference between the phase of the unknown voltage U and the known voltage K. This first rectified voltage is applied to a comparison switching device 40. Similarly, from the output 17 of the second rectifier 30 a rectified voltage proportional to the amplitude of the comparison voltage appears and is applied to the comparison switching device 40. In accordance with the operation of the comparison switching device 40 which will be described hereinbelow, ground potential will be applied to its output terminal 18 whenever the comparison voltage is of a different phase or amplitude of the voltage to be tested. This ground potential remains until the unknown voltage is of the same phase or amplitude as the comparison voltage, at which time the ground potential is removed.

In the event that the unknown voltage U is to be tested for its amplitude only, it is not necessary for the known comparison voltage K to be applied to the mixing device 10. Rather, the voltage K can be directly applied to the second rectifier 30. In this case, of course, only the unknown voltage U is applied to the mixing device 10.

Figure 2:
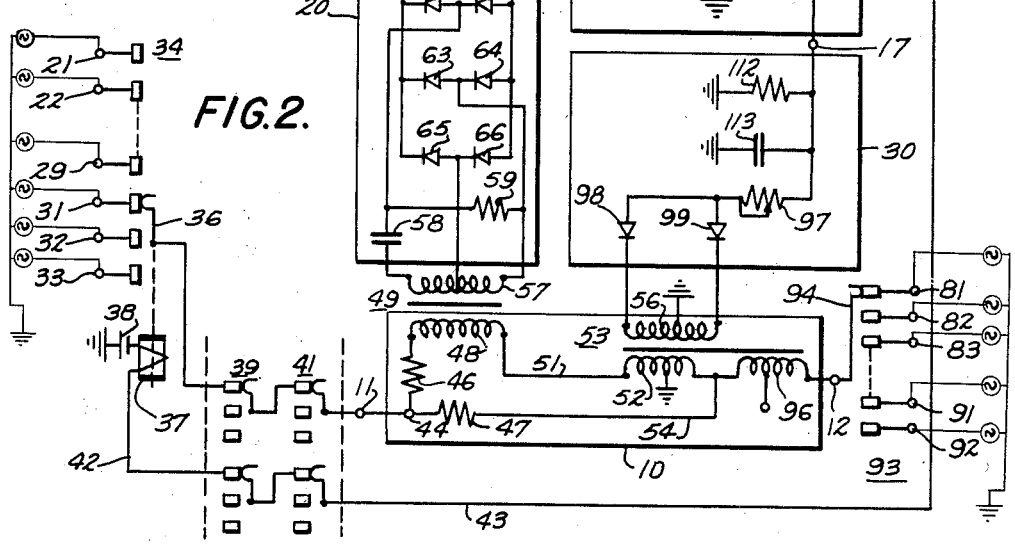
Fig. 2 is a schematic diagram of the apparatus showing the connections of the elements within the blocks of Fig. 1.

Referring now to Fig. 2, the operation of each of the elements of the apparatus will be described. In automatic signalling systems or in systems for remote control or measurement, the unknown alternating voltage U to be tested can be one phase of a 12-phase system applied to the terminals 21—29 and 31—33 of a 12-pole stepping switch 34. The fixed contacts of the stepping switch 34 successively make contact with a movable contact 36 which is controlled by the stepping switch magnetic winding 37.

The magnetic winding 37 has one side connected to a direct-current potential source 38, the other side of which is connected to ground. It is accordingly clear that when the other side of the magnetic winding 37 is connected to ground, this winding will be energized and will cause the movable contact 36 of switch 34 to mate successively with the fixed contacts connected to the 12 terminals 21—29 and 31—33.

If this embodiment relates to an automatic telegraph or telephone system, the switch 34 may be the final selector thereof, preferably a uniselector, as shown. The movable contact 36 would then be the control wiper of the selector switch and would apply the unknown voltage to be tested through a group selector 39 and a line or cord finder 41 to the input terminal 11 of the mixing device 10. Similarly, the other side of the magnetic winding 37 of the switch 34 is applied on a conductor 42 through the group selector switch 39 and the cord finder 41 to a conductor 43 connected to the output terminal 18 of the comparison switching device 40.

The input terminal 11 of the mixer 10 is connected to a joint terminal connection 44 of one side each of two resistors 46 and 47. The other side of resistor 46 is connected to one end of a primary winding 48 of a transformer 49. The other end of the primary winding 48 is connected on a conductor 51 to the first end of a first primary winding 52 of a transformer 53. It can be seen that the midpoint of the primary winding 52 is connected to ground. The other end of the primary winding 52 is connected on conductor 54 to the opposite end of the resistor 47.

It can be seen that the unknown alternating voltage applied to the input terminal 11 produces two currents flowing through separate parallel branches to ground. The first branch consists of resistor 46, primary winding 48 and the first half of the first primary 52 to ground. The second parallel branch consists of resistor 47 and the second half of the first primary 52. It is apparent that the respective values of resistors 46 and 47 and the windings 48 and 52 may be chosen so that each parallel branch presents an equal impedance to the unknown alternating voltage U applied to the input terminal 11. Accordingly, the opposite and equal currents flowing through each path of the primary winding 52 to ground will not induce any voltage in the secondary winding 56 of the transformer 53.

However, the current flowing through the primary winding 48 of the transformer 49 will induce a voltage in the secondary winding 57 of the transformer 49 which is applied to the first rectifier 20. This voltage will of course be proportional to the amplitude of the unknown voltage U applied to the input terminal 11. In the rectifier 20, the secondary winding 57 has one end connected to one side of a capacitor 58, the other side of which is connected to a resistor 59 and the joint connection between two rectifiers 61 and 62. The other end of resistor 59 is connected to the opposite side of the secondary winding 57 and to the joint connection of the rectifiers 63 and 64. The midpoint of the secondary winding 57 is connected to the joint connection of the rectifiers 65 and 66.

It can be seen that in the rectifier 20, the connections of the capacitor 58, the resistor 59 and the midpoint of the secondary winding 57 with the six rectifiers 61—66 provides a combination which first converts the alternating voltage induced in the secondary winding 57 into a three-phase voltage and then provides full-wave rectification for each of the three phases. Accordingly, at the output terminal 16 of the first rectifier 20, a rectified voltage is obtained whose amplitude is substantially proportional to the amplitude of the unknown alternating voltage U applied to the input terminal 11. In the rectifier 20 it is seen that the output voltage is taken across an output resistor 67 connected between the terminal 16 and ground.

The output terminal 16 of the first rectifier 20 is connected in the comparison device 40 to the control grid of the first half of a comparison tube 50 through a resistor 68. The cathode of the first half of the tube 50 is connected to ground through a cathode resistor 69 and a cathode biasing source 71. The anode of the first half of the tube 50 is connected to the positive terminal of a D. C. potential source 72 through an anode resistor 73 and a first energizing winding 74 of a polarized relay 75. This anode is also connected to the screen of the second half of the comparison tube 50 whose cathode is connected to the cathode of the first half.

The anode of the second half of the tube 50 is connected to the positive terminal of the potential source 72 through an anode resistor 76 and a second energizing winding 77 of the relay 75. It can be seen that when the second energizing winding 77 of the relay 75 is energized, the armature 78 of the relay is connected to the output terminal 18 of the comparison and switching device 40. Since the armature 78 is directly connected to ground by means of a conductor 79 this applies a ground potential to the output terminal 18. On the other hand, when the first energizing winding 74 of the relay 75 is energized the armature 78 is disconnected from the output terminal 18 removing the ground potential therefrom.

The anode of the second half of the comparison tube 50 is also connected to the screen of the first half thereof and the suppressors of both halves of the tube are connected together and to the cathodes.

Accordingly, it can be seen that only one-half of the comparison tube 50 can be conducting at any one time since conduction in one-half of the tube immediately lowers the voltage applied to the screen of the other half, effectively cutting off the other half thereof. In one embodiment, the cathode biasing source 71 has a potential of —60 volts and the source 72 has a potential of 60 volts.

The constants of the elements of the tube 50 are chosen so that the second half of the comparison tube 50 is normally conducting while the first half is normally cut off. That is, the rectified voltage coming from the output terminal 16 of the first rectifier and applied to the control electrode of the first half of the tube 50 is normally more negative than the voltage applied to the control grid of the second half of the tube 50.

The known comparison voltage K, which may be derived from the same supply as the unknown voltage U, is connected to the terminals 81—92 of a stepping switch 93. The movable contact 94 of the switch 93 is connected to the input terminal 12 of the mixing device 10. The input terminal 12 is connected to one end of a second primary winding 96 of the transformer 53, the other end of which is connected to the primary winding 52.

In the second rectifier 30, the midpoint of the secondary winding 56 of the transformer 53 is connected to ground and the opposite ends of secondary 56 are connected to one end of an adjustable resistor 97 through rectifiers 98 and 99, respectively. The other end of the adjustable resistor 97 is connected to the output terminal 17 of the second rectifier device 30 which in turn is connected to the control grid of the second half of the tube 50 through a resistor 111. Also connected to the output terminal 17 of the second rectifier 30 is a filtering resistor and capacitor 112 and 113 respectively.

In operation, the stepping switch 93 is energized so that the desired, known comparison voltage is applied to the input terminal 12. This voltage produces a current in the second primary winding 96 of the transformer 53 which induces an alternating voltage in the secondary winding 56 of this transformer. This induced alternating voltage is rectified by the full-wave rectifiers 98 and 99 and applied to the output terminal 17 of the second rectifier 30 through the adjustable resistor 97 after being smoothed by the resistor 112 and the capacitor 113. This rectified voltage is applied to the control grid of the second half of the comparison tube 50 through the resistor 111.

The comparison voltage applied to the input terminal 12 also produces a current which tends to run from ground through the left-half of the first primary winding 52 of the transformer 53 and the primary winding 48 of the transformer 49. It can be seen that this current produced by the known comparison voltage flows through the primary winding 48 in a direction opposite to the current produced by any of the unknown voltages applied to the input terminal 11.

Accordingly, if the movable contact 36 of the switch 34 is connected to one of the phases of the unknown voltage which is different from the phase of the known comparison voltage, there will be a resultant current flow to the primary winding 48 of the transformer 49 which represents the difference between the known voltage applied to the terminal 12 and the unknown voltage applied to the terminal 11. This difference current will induce an alternating voltage in the secondary winding 57 of the transformer 49 which voltage will be proportional to the difference in phase and amplitude between the known and the unknown voltages.

This alternating voltage induced in the secondary winding 57 will be converted into a three-phase voltage by the connections of the capacitor 58, the resistor 59, and the midpoint of the secondary winding 57. Each of the phases of this three-phase voltage will be rectified by the operation of the rectifiers 61—66 and will be applied to the output terminal 16 of the first rectifier 20. This rectified difference voltage is applied to the control grid of the first half of the comparison tube 50 through the resistor 68. It is clear from the connections of the rectifiers that this voltage will be a negative voltage. As mentioned hereinabove, the constants of the anode, cathode, and grid electrode circuits of the two halves of the comparison tube 50 are chosen so that the second half of the tube will be conducting while the first half will be cut off if the phase of the unknown voltage is different from the phase of the known voltage by more than a preselected amount. It is clear that these constants can also be prearranged so that this initial state of conduction will continue until the negative voltage applied to the control grid of the first half of tube 50 increases to zero.

However, in the event that the movable contact 36 of the switch 34 is connected to a phase of the unknown alternating voltage which is different from the known comparison voltage, a negative voltage will be applied to the control grid of the first half of the tube 50. Accordingly, the second half of the tube 50 will be conductive and the second energizing winding 77 of the polarized relay 75 will be energized. This connects the armature 78 of the relay to the output terminal 18 of the comparison device 40, as illustrated and applies ground potential to this terminal. This ground potential will be applied on conductor 43 to the cord finder switch 41 and the group selector switch 39 and from there on the conductor 42 to the winding 37 of the stepping switch 34.

Accordingly, this will energize the winding 37 of the switch 34 causing the movable contact 36 to successively contact the various fixed contacts of the switch 34. It is clear that the winding 37 will remain energized as long as the second half of the comparison tube 50 remains conductive. However, when the movable contact 36 makes contact with the contact of the switch 34 that is connected to the phase of the unknown voltage which corresponds to the phase of the known comparison voltage, the following will occur:

The current flowing through the primary winding 48 in one direction produced by the unknown voltage will be exactly equal to the current flowing through the primary winding 48 in the opposite direction produced by the known comparison voltage. Accordingly, no current will flow through the primary winding 48 and the voltage induced in the secondary winding 57 will immediately drop to zero. In turn, the voltage applied to the output terminal 16 of the first rectifier 20 will simultaneously drop to zero. This occurs simultaneously because of the absence of any smoothing and filtering elements in the first rectifier 20.

From the above, the voltage applied to the control grid of the first half of the tube 50 will immediately drop to zero causing the first half to start conducting. The flow of current through the anode resistor 73 of the first half of the tube 50 immediately reduces the potential of its anode which, in turn, reduces the potential applied to the screen of the second half of the tube 50. This is a regenerative action which continues until the second half of the tube 50 is completely cut off and the first half of the tube is conducting.

When the first half of the tube is conducting, the second winding 77 of the relay 75 is deenergized and the first winding 74 is energized. This causes the armature 78 of the relay 75 to be attracted to the position shown by the dotted line wherein the ground potential is removed from the output terminal 18. Accordingly, the winding 37 of the stepping switch 34 is deenergized and the movable contact 36 remains on the fixed contact with which it had last made contact. In view of the rapid operation of the circuit, the movable contact 36 is still connected to that contact which is connected to the phase which is equivalent to the phase of the applied known comparison voltage. Accordingly, the phase of the unknown comparison voltage has been completely determined.

As indicated above, the rapid and immediate action of the apparatus is achieved by the absence of time-delaying filtering elements. The use of filtering elements is avoided by the conversion of the alternating voltage induced in the secondary winding 57 of the transformer 49 into a polyphase voltage. In the illustrated embodiment this voltage is converted into a three-phase voltage, but it is apparent that more phases can be provided, if desired.

In the operation discussed above, the known comparison voltage was derived from the same supply as the unknown alternating voltage. Accordingly, both of these voltages have the same amplitude and could be out of phase a minimum of 30 electrical degrees of a maximum of 180 electrical degrees. The amplitude of the difference voltage induced in the secondary winding 57 will obviously be proportional to the number of degrees that the unknown voltage is out of phase with the known comparison voltage. That is, if the two voltages are 180° out of phase, a maximum voltage will be induced and if the two voltages are 30° out of phase a minimum voltage will be introduced for the out-of-phase comparisons. Of course, when the two voltages are in phase the induced voltage is zero. Since the two voltages have equal amplitudes, the minimum out-of-phase voltage induced in the secondary 57 can easily be ascertained. For example, if the amplitude of the voltages are each equal to E, the induced voltage will be about ½E. Therefore, the constants of the comparison tube 50 can be arranged so that the first half of the tube will not be rendered conductive until the voltage applied to its control grid is more positive than the negative voltage ¼E.

If a group of phases of the known voltage is to be compared to a corresponding group of phases of the unknown voltage, different operating limits can be established. For example, if three phases at a time are to be compared, a comparison of the minimum out-of-phase groups will result in an induced voltage equal to E. As the groups are more out of phase, the induced voltage will be higher. Therefore, adjustable resistor 97 can be varied so that the first half of the tube 50 will be rendered conductive by a voltage applied to its control grid more positive than its negative voltage ¾E.

It is also clear that more than three phases of a 12-phase system may be compared as well as phases of a system having more than 12 phases. The only adjustment that has to be made is the change in the operating constants of the comparison tube 50.

If only the amplitude of the known and unknown voltages are to be compared, it is not necessary for the known comparison voltage to produce a current flowing through the primary winding 48 of the transformer 49. This known voltage need only be applied directly to the second rectifier 30 wherein it will be rectified and applied to the control grid of the second half of the tube 50. Accordingly, a voltage will be induced in the secondary winding 57 of the transformer 49 which is proportional to the amplitude of the unknown voltage. When the amplitude of the unknown voltage equals the amplitude of the applied known voltage, the relative potentials applied to the control grids of the first half and of the second half of the tube 50, respectively, cause the first half to be rendered conductive and the second half to be rendered non-conductive. This energizes the winding 74 of the relay 75 to remove the ground potential from the output terminal 18. In this manner, the unknown voltage having the proper amplitude is determined.

It should be clear that the mixing device 10 can be arranged to provide the sum of the known and unknown voltages rather than the difference thereof. Also, the product of these voltages might be utilized. It would merely be necessary to properly adjust the constants of the comparison device 40 to make allowance for the quantities compared.

Figure 3:
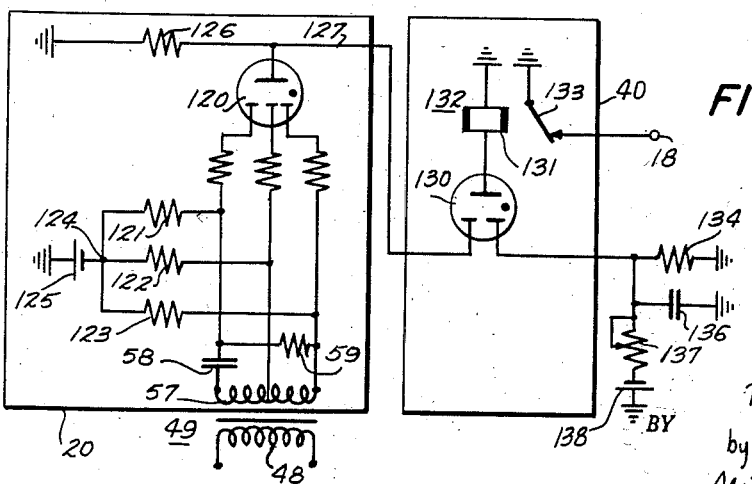
Fig. 3 is a schematic diagram of another embodiment of apparatus capable of carrying out the method of the present invention.

Referring now to Fig. 3, a second embodiment of an apparatus capable of carrying out the method of the present invention is illustrated. In place of the polyphase rectifier in the first rectifier device 20, a cold cathode tube 120 having three control electrodes is used. The connections of the mixing device 10 remains substantially the same. As before the voltage induced in the secondary winding 57 is converted to a three-phase voltage by a combination of the capacitor 58, the resistor 59, and the midpoint connection of the secondary winding. In this embodiment, the resistors 121, 122 and 123 form an artificial Y connection having a star point 124 to which is connected the negative terminal of the potential source 125 whose positive terminal is connected to ground. The source 125 supplies anode voltage to the anode of the cold cathode tube 120.

Accordingly, in operation, any of the three control electrodes of the cold cathode tube 120 may produce an arc with respect to any of the other tube electrodes. The control electrode having the lowest voltage relative to the anode operates as the cathode. If the voltage induced in the secondary winding 57 of the transformer 49 is sufficiently high, the tube will be ignited by the potential applied to one of the three control electrodes. Conduction of current through the ignited tube 120 reduces the potential on its anode due to the operation of the anode resistor 126. This anode is connected on conductor 127 to one of the control electrodes of a second cold cathode tube 130 which serves as a comparison tube in this embodiment.

Connected to the anode of the tube 130 is the winding 131 of a relay 132 which corresponds to the relay 75 in the embodiment illustrated in Fig. 2. Relay 132 operates an armature 133 which connects or disconnects ground potential to the output terminal 18 of the comparison device 40.

The second control electrode of the tube 130 is connected to ground to a resistor 134 and a capacitor 136 and is also connected through an adjustable resistor 137 to the negative terminal of a potential source 138, the positive terminal of which is connected to ground.

In operation therefore, when the phase of the unknown voltage corresponds to the phase of the known comparison voltage, the voltage induced in the secondary winding 57 of the transformer 49 will be reduced to zero and the tube 120 will be extinguished since there will be no igniting voltage applied thereacross. This will raise the potential of the anode 120 an amount sufficient to cause the discharge of the tube 130 to energize the winding 131 of the relay 132. Energization of the relay 132 attracts the armature 133 thereto and removes the ground potential from the output terminal 18. Accordingly, it can be seen that the rectifier 20 and comparison device 40 illustrated in Fig. 3 can provide the same function provided by the corresponding circuits illustrated in Fig. 2.

It will be understood that each of the elements described above, or two or more together, may also find a useful application in other types of comparison devices differing from the types described above.

While the invention has been illustrated and described as embodied in an amplitude and phase testing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an arrangement for identifying the characteristics of a single-phase alternating-current voltage having unknown characteristics with a comparison voltage having known characteristics, in combination, mixing means having a first and a second input and a first and a second output, said first input being adapted to be connected to said single-phase alternating-current voltage whose characteristics are unknown and to be determined, said second input of said mixing means being adapted to be connected to a comparison voltage whose characteristics are known, said mixing means including means for producing a first voltage output at said first output of said mixing means when said inputs thereof are connected to their respective voltages, said first voltage output being proportional to a preselected combination of said known and unknown voltages, said mixing means further including means for producing a second voltage output at said second output of said mixing means proportional to said known voltage; first rectifying means connected to said first output of said mixing means for changing said first voltage output to a polyphase alternating-current voltage and for rectifying the same to provide a first rectified voltage output; second rectifying means connected to said second output of said mixing means for rectifying said second voltage output to provide a second rectified voltage output; and comparing means responsive to said first and second rectified voltage outputs for comparing the same and for indicating when said unknown alternating-current voltage has characteristics of a predetermined relation to the known comparison voltage.

2. In an arrangement for identifying the characteristics of sequentially supplied single-phase alternating-current voltages having unknown characteristics with a comparison voltage having known characteristics, in combination, means for sequentially supplying said unknown voltages and having an output; mixing means having a first and a second input and a first and a second output, said first input being connected to said output of said supplying means, said second input of said mixing means being adapted to be connected to a comparison voltage whose characteristics are known, said mixing means including means for producing a first voltage output at said first output of said mixing means when said inputs thereof are connected to their respective voltages, said first voltage output being proportional to a preselected combination of said known and unknown voltages, said mixing means further including means for producing a second voltage output at said second output of said mixing means proportional to said known voltage; first rectifying means connected to said first output of said mixing means for changing said first voltage output to a polyphase alternating-current voltage and for rectifying the same to provide a first rectified voltage output; second rectifying means connected to said second output of said mixing means for rectifying said second voltage output to provide a second rectified voltage output; and comparing means responsive to said first and second rectified voltage outputs for comparing the same and for indicating when said unknown alternating-current voltage has characteristics of a predetermined relation to the known comparison voltage.

3. In an arrangement for identifying the characteristics of sequentially supplied single-phase alternating-current voltages having unknown characteristics with a comparison voltage having known characteristics, in combination, means for sequentially supplying said unknown voltages and having an output; mixing means having a first and a second input and a first and a second output, said first input being connected to said output of said supplying means, said second input of said mixing means being adapted to be connected to a comparison voltage whose characteristics are known, said mixing means including means for producing a first voltage output at said first output of said mixing means when said inputs thereof are connected to their respective voltages, said first voltage output being proportional to a preselected combination of said known and unknown voltages, said mixing means further including means for producing a second voltage output at said second output of said mixing means proportional to said known voltage; first rectifying means connected to said first output of said mixing means for changing said first voltage output to a polyphase alternating-current voltage and for rectifying the same to provide a first rectified voltage output; second rectifying means connected to said second output of said mixing means for rectifying said second voltage output to provide a second rectified voltage output; comparing means responsive to said first and second rectified voltage outputs for comparing the same, said comparing means having an output; and control means responsive to the output of said comparing means for operating said supplying means when said unknown alternating-current voltage does not have characteristics of a predetermined relation to the known comparison voltage; and for rendering said supplying means inoperative when said unknown alernating-current voltage has characteristics of said predetermined relation to the known comparison voltage.

References Cited in the file of this patent

UNITED STATES PATENTS

| | | |
|---|---|---|
| 2,454,781 | Deakin | Nov. 30, 1948 |
| 2,541,276 | Oliver | Feb. 13, 1951 |
| 2,582,676 | Bordewieck | Jan. 15, 1952 |
| 2,676,286 | Buchner | Apr. 20, 1954 |
| 2,683,214 | Henquet | July 6, 1954 |
| 2,684,479 | Hill et al. | July 20, 1954 |
| 2,731,519 | Bordewieck | Jan. 17, 1956 |